United States Patent
Konno et al.

(10) Patent No.: US 8,576,284 B2
(45) Date of Patent: Nov. 5, 2013

(54) MONITORING SYSTEM, MONITORING APPARATUS AND MONITORING METHOD

(75) Inventors: Georgero Konno, Kanagawa (JP); Makoto Usami, Kanagawa (JP)

(73) Assignee: Sony Corporation (JP)

( * ) Notice: Subject to any disclaimer, the term of this patent is extended or adjusted under 35 U.S.C. 154(b) by 1491 days.

(21) Appl. No.: 11/999,309

(22) Filed: Dec. 5, 2007

(65) Prior Publication Data

US 2008/0151051 A1    Jun. 26, 2008

(30) Foreign Application Priority Data

Dec. 20, 2006 (JP) ............................... P2006-343003

(51) Int. Cl.
*H04N 7/18* (2006.01)
(52) U.S. Cl.
USPC ............. 348/148; 348/143; 348/149; 705/13; 340/932.2; 340/933
(58) Field of Classification Search
None
See application file for complete search history.

(56) References Cited

U.S. PATENT DOCUMENTS

| | | | |
|---|---|---|---|
| 6,556,819 B2 | 4/2003 | Irvin | |
| 7,104,447 B1 * | 9/2006 | Lopez et al. | 705/13 |
| 2005/0068196 A1 * | 3/2005 | Marin | 705/13 |
| 2005/0083212 A1 * | 4/2005 | Chew | 705/13 |

FOREIGN PATENT DOCUMENTS

| | | |
|---|---|---|
| JP | 3-029099 A | 2/1991 |
| JP | 6-333199 A | 12/1994 |
| JP | 2001-229487 A | 8/2001 |
| JP | 2002-197589 A | 7/2002 |
| JP | 2004-094412 A | 3/2004 |
| JP | 2006-099685 A | 4/2006 |

* cited by examiner

*Primary Examiner* — Thu Nguyen
*Assistant Examiner* — Nam Tran
(74) *Attorney, Agent, or Firm* — Lerner, David, Littenberg, Krumholz & Mentlik, LLP

(57) ABSTRACT

In a monitoring system for monitoring parking of a vehicle in a specific area by a monitoring image pick-up device, and a monitoring apparatus, the monitoring image pick-up device includes an image pick-up portion. And the monitoring apparatus includes: a parking area enter/exit determining portion for determining whether or not a vehicle enters or exits from the specific area; an imaging setting change instructing portion for instructing the image pick-up portion to change an imaging setting to another one suitable for capturing a vehicle image containing specific information on the vehicle when it is determined that the vehicle enters or exits from the area; and a parking determining portion for calculating a time for which the vehicle is parked in the area from image capturing time when the vehicle enters the area, and image capturing time when the vehicle exits from the area.

8 Claims, 8 Drawing Sheets

EXAMPLE IN PHASE OF VEHICLE DETECTION

CONSTRUCTIONAL EXAMPLE OF MONITORING SYSTEM

CONSTRUCTIONAL EXAMPLE OF MONITORING SYSTEM

EXAMPLE OF INTERNAL STUCTURE OF MONITORING CAMERA

EXAMPLE IN PHASE OF VEHICLE DETECTION

EXAMPLE IN PHASE OF EXIT OF VEHICLE

MONITORING SYSTEM, MONITORING APPARATUS AND MONITORING METHOD

CROSS-REFERENCES TO RELATED APPLICATIONS

The present application claims priority from Japanese Patent Application No. JP 2006-343003, filed in the Japanese Patent Office on Dec. 20, 2006, the entire content of which is incorporated herein by reference.

BACKGROUND OF THE INVENTION

1. Field of the Invention

The present invention relates to a monitoring system which, for example, is suitable for being applied to a system for monitoring illegal parking of a vehicle in a no-parking area, a monitoring apparatus, and a monitoring method.

2. Description of the Related Art

In response to recent security crackdown for an illegally-parked vehicle in a general road or the like, for the purpose of reducing labor costs for crackdown staffs, a monitoring apparatus or a monitoring system which can detect an illegally-parked vehicle is devised.

Japanese Patent Laid-Open No. 2006-099685 discloses that a parked vehicle which is parked in one and the same position for a predetermined period of time or more is specified based on vehicle identification information, vehicle position information, and acquisition time information.

SUMMARY OF THE INVENTION

Now, with such a monitoring apparatus or monitoring system, a vehicle which is being parked in a no-parking area is photographed by using a monitoring camera, and video data obtained by photographing the vehicle is recorded as evidence for illegal parking. The specification for the illegally-parked vehicle is carried out by using information on a number plate of the illegally-parked vehicle in many cases. In such cases, the monitoring camera for photographing the illegally-parked vehicle is installed in a position where it can photograph the number plate of the illegally-parked vehicle.

However, in a state in which a plurality of vehicles are parallel-parked, or the like, an angle at which the number plates of the parked vehicles can be photographed is limited to very narrow one. In order to precisely photograph the number plates of the respective parked vehicles in such a situation, there is encountered a problem that, for example, one monitoring camera must be installed per one vehicle as an object of the crackdown, that is, a plurality of monitoring cameras must be installed for a plurality of vehicles parallel-parked.

The present invention has been made in the light of the foregoing, and it is therefore desirable to provide a monitoring system, a monitoring apparatus and a monitoring method each of which is capable of recording that a vehicle is parked in a specific area such as a no-parking area for a given period of time without increasing the number of monitoring cameras installed.

According to an embodiment of the present invention there is provided a monitoring system for monitoring parking of a vehicle in a specific area by using a monitoring image pick-up device, and a monitoring apparatus for performing the monitoring based on video data obtained by capturing an image of the vehicle by the monitoring image pick-up device. The monitoring image pick-up device includes an image pick-up portion for capturing an image of the specific area and a peripheral area thereof to generate the video data. And the monitoring apparatus includes: a parking area enter/exit determining portion for determining whether or not a vehicle detected based on the video data generated by the image pick-up portion of the monitoring image pick-up apparatus enters or exits from the specific area; an imaging setting change instructing portion for instructing the image pick-up portion of the monitoring image pick-up apparatus to perform changing of an imaging setting to another one suitable for imaging of a vehicle image containing therein specific information on the vehicle when the parking area enter/exit determining portion determines that the vehicle detected based on the video data enters or exits from the specific area; and a parking determining portion for calculating a period of time for which the vehicle is parked in the specific area based on imaging time of an image when the vehicle enters the specific area, and imaging time of an image when the vehicle exits from the specific area, both the images being captured by the image pick-up portion of the monitoring image pick-up device in accordance with the instruction issued from the imaging setting change instructing portion.

According to the above embodiment of the present invention, the image of the vehicle when the vehicle enters or exits from the specific area is captured. When the specific area, for example, is a no-parking area on a road, a front portion and a back portion of the vehicle are not blocked by adjacent parked vehicles or the like either in a phase of enter into the specific area or in a phase of exit from the specific area. Thus, the specific information on the vehicle is free from concealment. As a result, the specific information on the vehicle is contained in the captured image of the vehicle.

In this case, since the angle at which the image of the vehicle containing therein the specific information on the vehicle is captured is not limited, it is unnecessary to install a plurality of monitoring cameras for capturing the image of the vehicle containing therein the specific information on the vehicle.

According to the embodiments described above of the present invention, it is possible to record that the vehicle is parked in the specific area for a given period of time based on the image of the vehicle in the phase of entering the specific area such as the no-parking area, the image of the vehicle in the phase of exiting from the specific area, and the information on the period of time for which the vehicle is parked in the specific area.

DETAILED DESCRIPTION OF THE PREFERRED EMBODIMENTS

Hereinafter, embodiments of the present invention will be described in detail with reference to the accompanying drawings. In an embodiment which will be described below, the present invention is applied to a monitoring system composed of a monitoring camera (monitoring image pick-up device), and a client terminal (monitoring apparatus). Here, the monitoring camera captures an image of a no-parking area and a peripheral area thereof to generate video data and metadata (attribute information) of video data such as imaging time information. Also, the client terminal detects an illegally-parked vehicle by analyzing the video data and the metadata obtained from the monitoring camera, and calculates a period of time for which the vehicle is illegally parked.

Figure 1A:
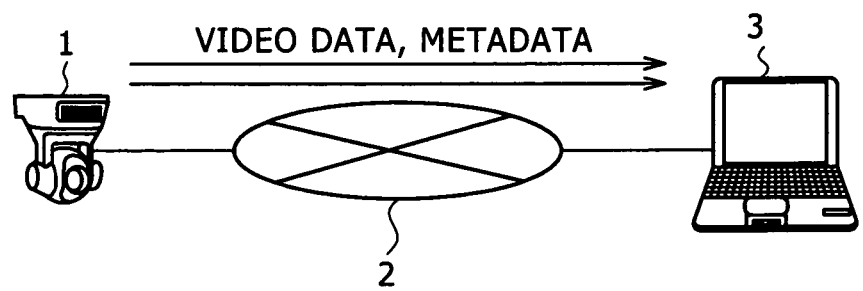
FIGS. 1A and 1B are views explaining respective constructional examples of a monitoring system according to an embodiment of the present invention.
Figure 1B:
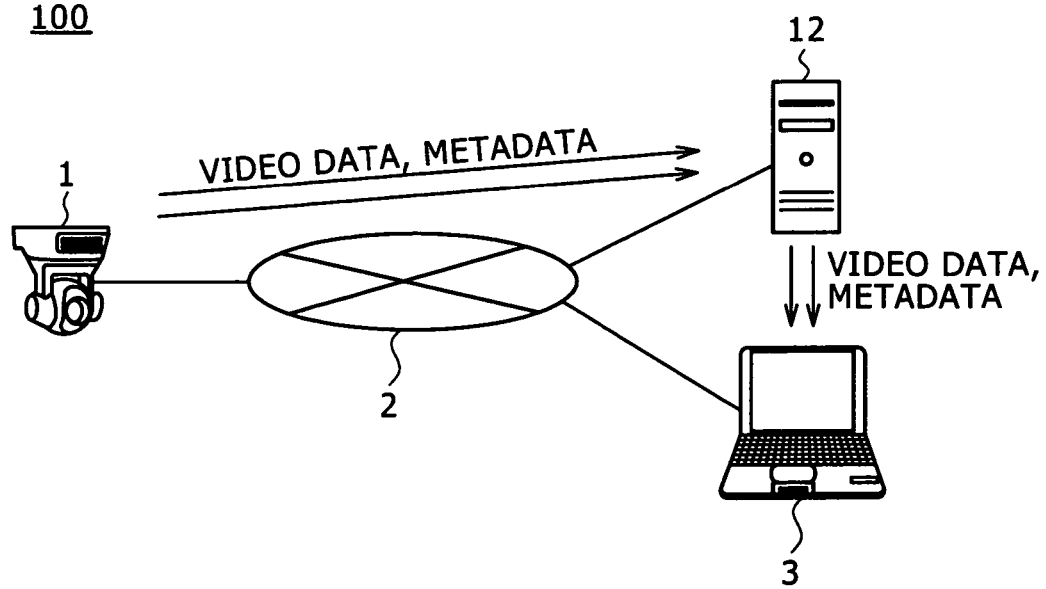

FIGS. 1A and 1B are views showing respective connection constructions in the monitoring system according to this embodiment of the present invention. FIG. 1A shows the monitoring system in which the client terminal acquires the video data and the metadata outputted from the monitoring camera through a network. This embodiment will now be described by giving the case where the present invention is applied to the monitoring system having the construction as shown in FIG. 1A as an example. However, as shown in FIG. 1B, the present invention may also be applied to a monitoring system (server/client system) in which a server 12 acquires video data and metadata outputted from the monitoring camera 1, and supplies the video data and the metadata thus acquired to a client terminal 3. Or, in the case of a monitoring camera having a moving image detecting function and a metadata analyzing function, this monitoring camera may be used in the form of stand-alone.

As shown in FIG. 1A, the monitoring system 100 is composed of the monitoring camera 1, the client terminal 3, and the network 2. Here, the monitoring camera 1 captures an image of a monitoring area and a peripheral area thereof to generate video data, and generates metadata such as data on imaging time from the video data. The client terminal 3 stores the video data and the metadata which are acquired from the monitoring camera 1 and carries out specification of an illegally-parked vehicle, and calculation for a parking period of time by analyzing the metadata. Also, the monitoring camera 1 and the client terminal 3 are connected to each other through the network 2. In this embodiment, it is assumed that the monitoring camera 1 for capturing the image of the monitoring area and the peripheral area thereof is installed in a position located above the no-parking area, or the like, and the client terminal 3 is installed on the premises or the like of an agency for carrying out the crackdown for the illegal parking. The details of the metadata will be described later.

The metadata which the client terminal 3 acquires from the monitoring camera 1 through the network 2 is analyzed through a metadata filter (hereinafter referred to as "a filter" as well) which is previously set within the client terminal 3. When it is determined as the result of executing the filter processing that a vehicle being photographed enters or exits from the no-parking area, in order to cause the monitoring camera 1 to photograph a number plate as vehicle specification information, the client terminal 3 supplies a changing instruction signal for a photographing setting to the monitoring camera 1. Note that, it is to be understood that the number of monitoring cameras, the number of client terminals, the number of servers and client terminals are not limited thereto in this embodiment.

Here, a description will now be described with respect to the metadata generated in the monitoring camera. The metadata means attribute information of the video data obtained by capturing an image of an object by the monitoring camera 1. Thus, the metadata is composed of object information such as an ID, the coordinates and a size of a dynamic body (object), information on a number plate of a vehicle, photographing time information, direction information on the monitoring camera, and the like when the dynamic body (corresponding to the vehicle in this embodiment) is detected by the monitoring camera 1.

The metadata filter which is described on the assumption that it is previously set in the client terminal 3 is one in which the rules for analysis of the metadata are described. For example, the following seven kinds of metadata filters are known as the kinds of metadata filters.

Appearance: a filter for discriminating whether or not a body (hereinafter referred to as "an object" as well) exists in a certain area.

Disappearance: a filter for discriminating whether or not a body appears in a certain area and exits from the certain area.

Passing: a filter for discriminating whether or not a body passes through a certain borderline.

Capacity: a filter for counting the number of bodies existing in a certain area, and discriminating whether or not the cumulative number of bodies exceeds a predetermined value.

Loitering: a filter for discriminating whether or not a body loiters within a certain area for more than a predetermined period of time.

Unattended: a filter for discriminating whether or not a body which has entered a certain area and does not move exists in a certain area for more than a predetermined period of time.

Removed: a filter for detecting that a body which has existed in a certain area is removed.

When the result of analyzing (filter-processing) the metadata by using these filters shows that there is an object corresponding to any one of those filters, this result is outputted in the form of alarm information. With regard to the data outputted in the form of the alarm information, there are "the number of objects" as the number of objects agreeing with the filter conditions, "the cumulative number of objects" as the cumulative total value of the objects detected by using any suitable one of those filters, and the like. In this embodiment, an illegally-parked vehicle is detected by using the Passing filter, and the object information or the like on the illegally-parked vehicle thus detected is outputted in the form of the alarm information.

Figure 2:
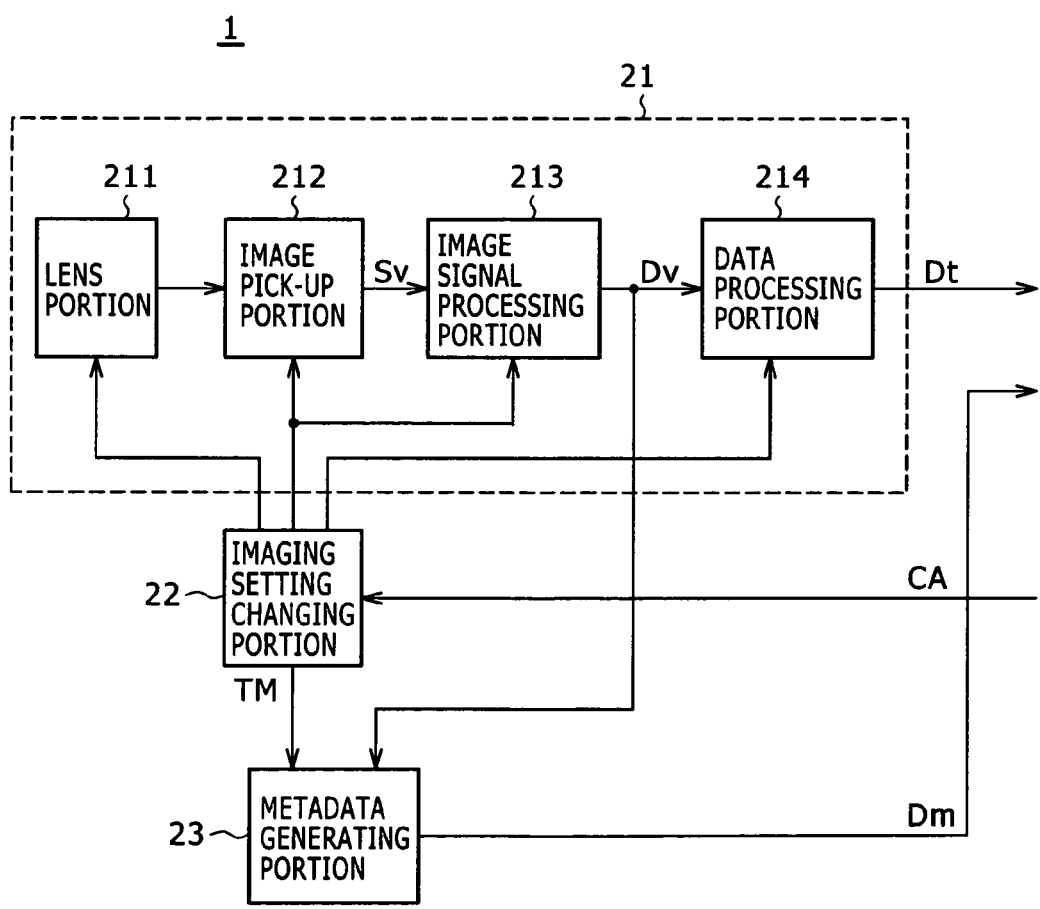
FIG. 2 is a block diagram showing an example of an internal construction of a monitoring camera in the monitoring system shown in FIGS. 1A and 1B according to the embodiment of the present invention.

Next, a detailed internal structure of the monitoring camera 1 shown in FIG. 1A will now be described with reference to a functional block diagram of FIG. 2. The monitoring camera 1 is composed of a video data generating portion 21 surrounded and indicated by a dashed line, an imaging setting changing portion 22, and a metadata generating portion 23. Firstly, portions constituting the video data generating portion 21 will be described below. An image pick-up portion 212 photoelectrically converts a captured light which is imaged on an image pick-up element (not shown) in the image pick-up portion 212 through a lens portion 211 to generate an imaging signal Sv.

In addition, the image pick-up portion 212, for example, includes a preamplifier portion (not shown) and an analog/ digital (A/D) conversion portion (not shown). The preamplifier portion amplifies an electrical signal level of the imaging signal Sv, and removes a reset noise through correlation double sampling. Also, the A/D conversion portion converts the imaging signal Sv from an analog signal to a digital signal. The imaging signal Sv for which the various processing is executed in the image pick-up portion 212 in such a manner is supplied to an image signal processing portion 213.

The image signal processing portion 213 executes image signal processing for the imaging signal Sv supplied thereto from the image pick-up portion 212 to generate video data Dv. With regard to the image signal processing, there are carried out Knee correction, γ correction, white clip processing or black clip processing, and the like. Here, in the Knee correction, a portion of the imaging signal Sv at a certain level or more is compressed. In the γ correction, a level of the imaging signal Sv is corrected so as to follow a γ curve. Also, in the white clip processing or black clip processing, a signal level of the imaging signal Sv is limited so as to fall within a predetermined range. Thus, the video data Dv is supplied to a data processing portion 214.

The data processing portion 214, in order to reduce an amount of data when communicating with the client terminal 3 or the like, executes encoding processing for the video data Dv supplied thereto to generate video data Dt. Moreover, the data processing portion 214 causes the video data Dt to have a predetermined data structure, and supplies the resulting video data Dt to the client terminal 3.

The imaging setting changing portion 22 carries out change or the like of a direction and a resolution of the monitoring camera 1 so as to obtain the optimal captured image in accordance with a changing instruction signal CA inputted thereto from the client terminal 3. The client terminal 3 determines whether or not the vehicle enters or exits from the no-parking area. When recognizing that the vehicle enters or exits from the no-parking area, the client terminal 3 transmits the changing instruction signal CA to the imaging setting changing portion 22 of the monitoring camera 1. When receiving the changing instruction signal CA from the client terminal 3, the imaging setting changing portion 22 supplies instruction signals to perform changing of an imaging direction, a zoom ratio, a resolution, and the like to the lens portion 211, the image pick-up portion 212, the image signal processing portion 213, and the data processing portion 214 of the video data generating portion 21, respectively. The details of the determination relating to whether or not the detected vehicle is illegally-parked one will be described later.

The resolution of the image photographed by the monitoring camera 1 is set at a low resolution such as a quarter video graphics array (QVGA) in a state in which the monitoring camera 1 monitors the no-parking area and the peripheral area thereof. Also, when the vehicle which has entered or exited from the no-parking area is detected, the resolution of the image photographed by the monitoring camera 1 is set at a high resolution such as a video graphics array (VGA) or a super extended graphics array (SXGA).

The metadata generating portion 23 generates metadata Dm as the attribute information on an object of the monitoring. In a word, in the metadata generating portion 23, a dynamic body (illegally-parked vehicle) is detected by using the video data Dv generated in the video data generating portion 21. Also, dynamic body detection information representing whether or not the dynamic body is detected, and information on a number plate of the vehicle as the detected dynamic body are contained in the metadata. In addition, the metadata generating portion 23 contains time information TM in the metadata, which results in that it can reserve time at which the metadata is generated, that is, time at which the illegally-parked vehicle enters the no-parking area, and time at which the illegally-parked vehicle exits from the no-parking area in the form of recording.

Here, structures of the video data and the metadata will now be described. Each of the video data and the metadata is composed of a data main body and link information. The data main body is video data of a vehicle photographed by the monitoring camera 1 in the video data. Also, the data main body is data in which the attribute information or the like on the monitoring object, and attribute information in which a description system of that attribute information or the like is defined are described in the metadata. On the other hand, the link information is one in which association information representing association between the video data and the metadata, and definition or the like of a description system of the contents of the association information are described.

For example, a time stamp, a sequence number or the like for specifying the video data is used as the association information. The time stamp means time information of the video data, and the sequence number means sequence information which is given in the order of generation of the contents data. Thus, the imaging data on the vehicle as the video data, and the data on the time at which the vehicle is photographed as the metadata are managed so as to show one-on-one association.

Figure 3:
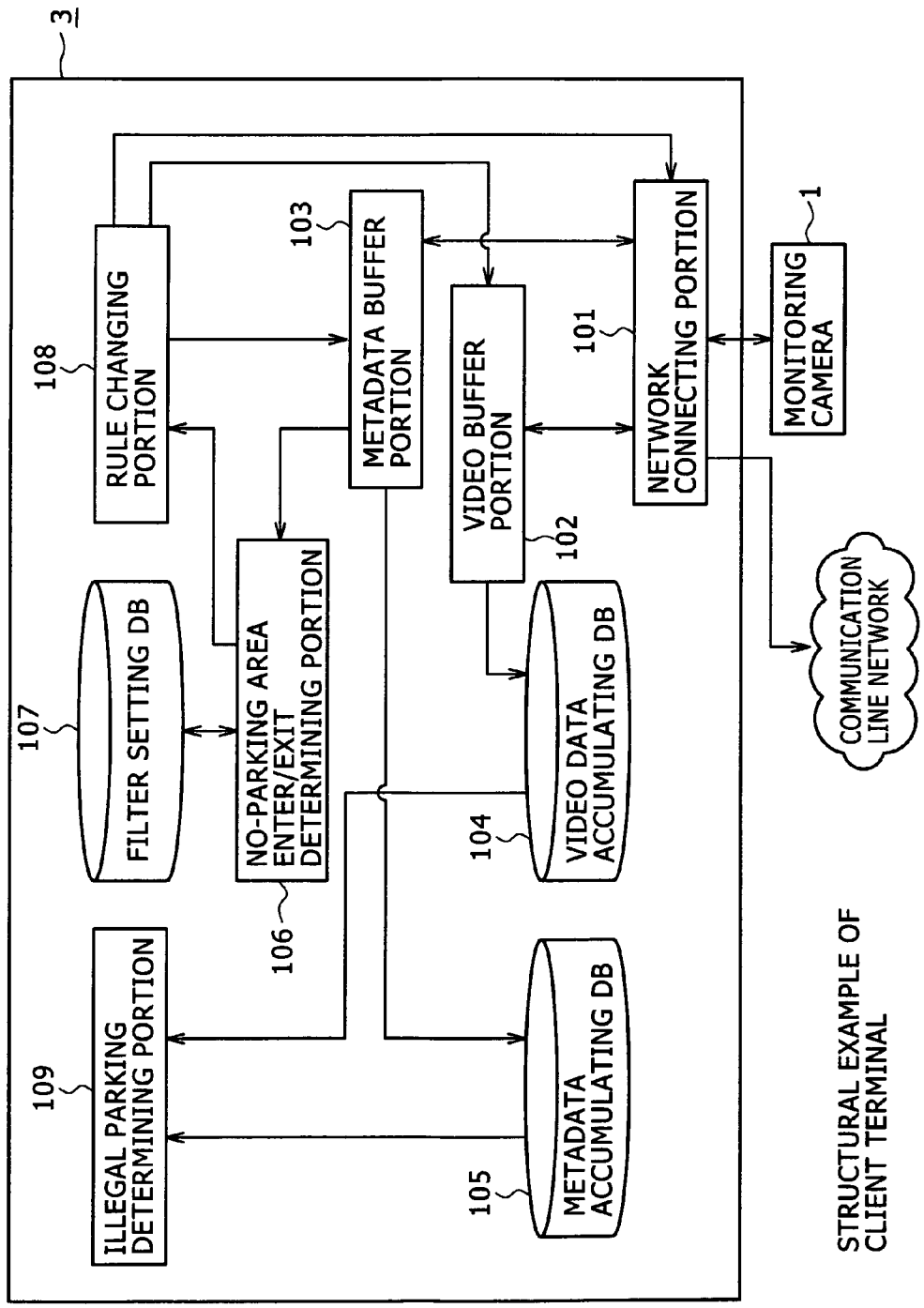
FIG. 3 is a block diagram showing a constructional example of a client terminal (monitoring apparatus), in the monitoring system shown in FIGS. 1A and 1B, according to an embodiment of the present invention.

Next, the details of a structural example of the client terminal 3 shown in FIG. 1A will now be described with reference to a functional diagram of FIG. 3. Referring to FIG. 3, the client terminal 3 includes a network connecting portion 101, a video buffer portion 102, a video data accumulating database 104, a metadata buffer portion 103, a metadata accumulating database 105, a no-parking area enter/exit determining portion 106, a filter setting database 107, a rule changing portion 108, and an illegal parking determining portion 109. Here, the data is transmitted between an external apparatus such as the monitoring camera 1, and the network connecting portion 101. The video buffer portion 102 acquires the video data from the monitoring camera 1. The video data accumulating database 104 stores therein the acquired video data. The metadata buffer portion 103 acquires the metadata containing therein the photographing time information or the like from the monitoring camera 1. The metadata accumulating database 105 stores therein the acquired metadata. The no-parking area enter/exit determining portion 106 determines whether or not the vehicle enters or exits from the no-parking area by executing the filter processing for the metadata. The filter setting database 107 stores therein data on setting of a virtual borderline (filter) based on which the no-parking area and other area are distinguished from each other. The rule changing portion 108 instructs the monitoring camera 1 to change the photographing setting through the network connecting portion 101. Also, the illegal parking determining portion 109 specifies the illegally-parked vehicle, and calculates a period of time for which the vehicle is illegally parked in the no-parking area.

The video buffer portion 102 acquires the video data from the monitoring camera 1 through the network connecting portion 101, and executes processing for decoding the encoded video data. In addition, the video buffer portion 102 causes the video data accumulating database 104 to store therein the video data held in the video buffer portion 102 in accordance with a recording request supplied from the rule changing portion 108 which will be described later.

The metadata buffer portion 103 temporarily accumulates therein the metadata acquired from the monitoring camera 1, and causes the metadata accumulating database 105 to successively store therein the metadata accumulated in the metadata buffer portion 103. When the metadata is accumulated in the metadata accumulating database 105, time information of the video data synchronized with the metadata is added to the metadata.

The data on the setting of the filters such as the borderline is stored in the filter setting database 107. The data on the filter setting is supplied to the no-parking area enter/exit determining portion 106 which will be described below at a timing at which the no-parking area enter/exit determining portion 106 executes the filter processing.

The no-parking area enter/exit determining portion 106 executes the filter processing for the metadata acquired from the metadata buffer portion 103 by using the data on the filter setting accumulated in the filter setting database 107. Also, the no-parking area enter/exit determining portion 106 informs the rule changing portion 108 of the filter processing results. That is to say, the no-parking area enter/exit determining portion 106 determines whether or not the dynamic body detected by the monitoring camera 1 enters or exits from the no-parking area by using the filter (virtual borderline) stored in the filter setting database 107. Also, the no-parking area enter/exit determining portion 106 outputs the determined results to the rule changing portion 108.

The rule changing portion 108 generates the changing instruction signal CA based on the filter processing results reported from the no-parking area enter/exit determining portion 106. Thus, the rule changing portion 108 instructs the monitoring camera 1 to change the photographing direction, the zoom ratio, the resolution, and the like over to suitable ones, respectively. The monitoring camera 1 photographs the dynamic body at the high resolution such as the VGA or the SXGA in accordance with the changing instruction signal. CA transmitted thereto from the rule changing portion 108 through the network connecting portion 101. Also, the video data on the image of the dynamic body photographed at the high resolution is accumulated in the video buffer portion 102.

In addition, the rule changing portion 108 supplies a recording request signal to each of the video buffer portion 102 and the metadata buffer portion 103 based on the filter processing results obtained from the no-parking area enter/exit determining portion 106. Thus, the metadata accumulating database 105 is caused to store therein the metadata accumulated in the metadata buffer portion 103. Also, the video data accumulating database 104 is caused to store therein the video data accumulated in the video buffer portion 102. By adopting such a structure, only the information necessary for specification of the illegally-parked vehicle is stored.

The illegal parking determining portion 109 reads out the metadata stored in the metadata accumulating database 105, and the video data stored in the video data accumulating database 104. Thus, the illegal parking determining portion 109 executes processing for comparing the vehicles which are determined to enter the no-parking area and exit from the no-parking area, respectively, from the filter processing in the no-parking area enter/exit determining portion 106 with each other based on the number plate information recorded as the metadata. In addition, the illegal parking determining portion 109 calculates how long the vehicle is parked in the no-parking area from the information on the time at which the vehicle enters the no-parking area, and the information on the time at which the vehicle exits from the no-parking area. Also, when determining that the vehicle photographed by the monitoring camera 1 has been parked in the no-parking area for a given period of time from the calculated period of time for parking of the vehicle in the no-parking area, the illegal parking determining portion 09 informs a district police station or the like of illegal vehicle information through the network connecting portion 101. In this case, the illegal parking determining portion 109 transmits the video data in the phase of enter of the vehicle into the no-parking area, the video data in the phase of exit of the vehicle from the no-parking area, and the information on the calculated period of time for parking of the vehicle in the no-parking area as the illegal vehicle information.

Figure 4:
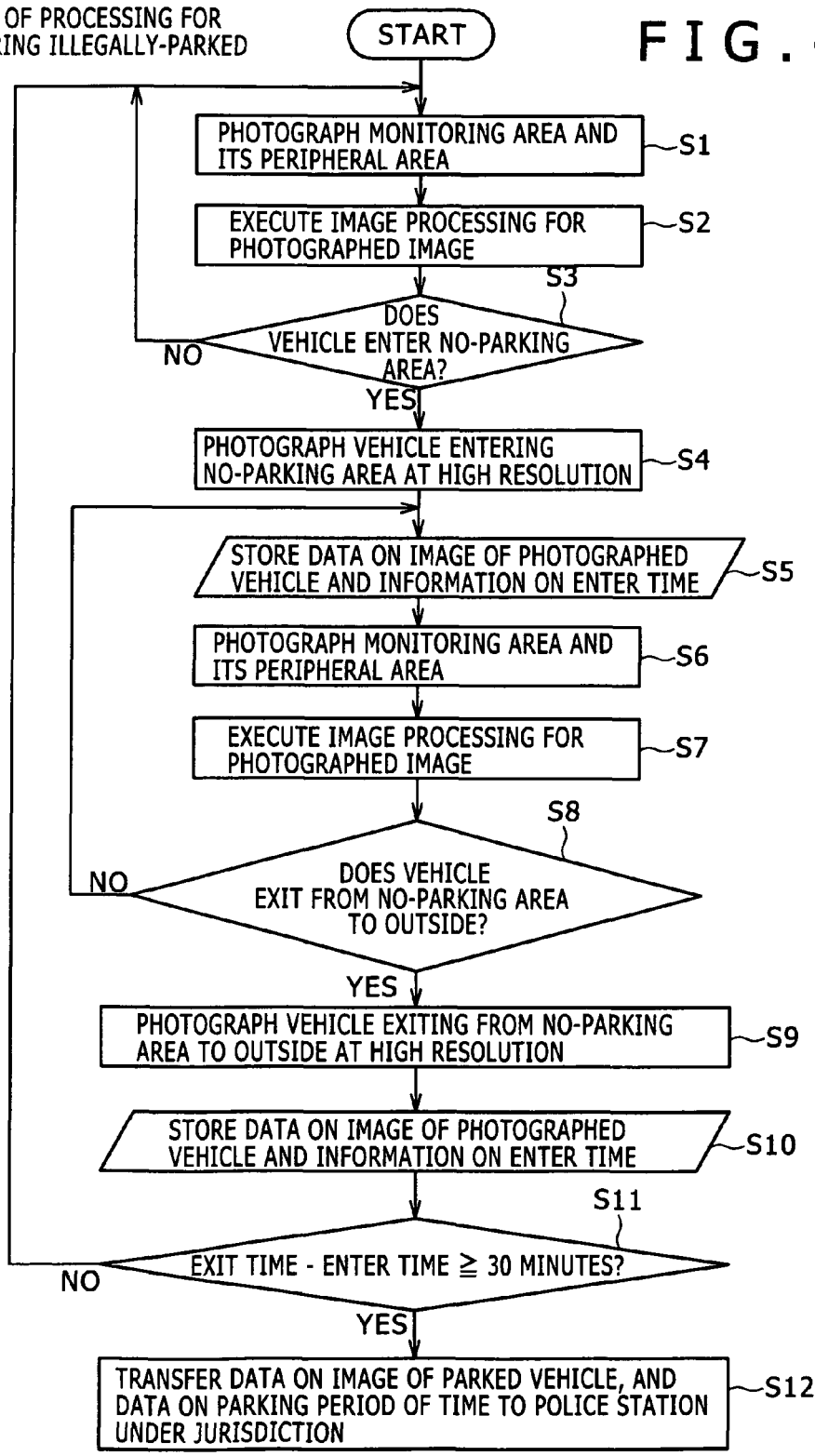
FIG. 4 is a flow chart showing processing for monitoring an illegally-parked vehicle in a monitoring method according to an embodiment of the present invention.

Next, processing for monitoring an illegally-parked vehicle in a monitoring method according to an embodiment of the present invention will now be described with reference to a flow chart of FIG. 4, and explanatory views of FIGS. 5 to 8. Referring to FIG. 4, firstly, the monitoring camera 1 photographs a no-parking area and a peripheral area thereof (Step S1). An image of the no-parking area and the peripheral area thereof obtained through the photographing is subjected to image processing in the image signal processing portion 213 (refer to FIG. 2) of the monitoring camera 1 whenever the photographing is carried out (Step S2).

Figure 5:
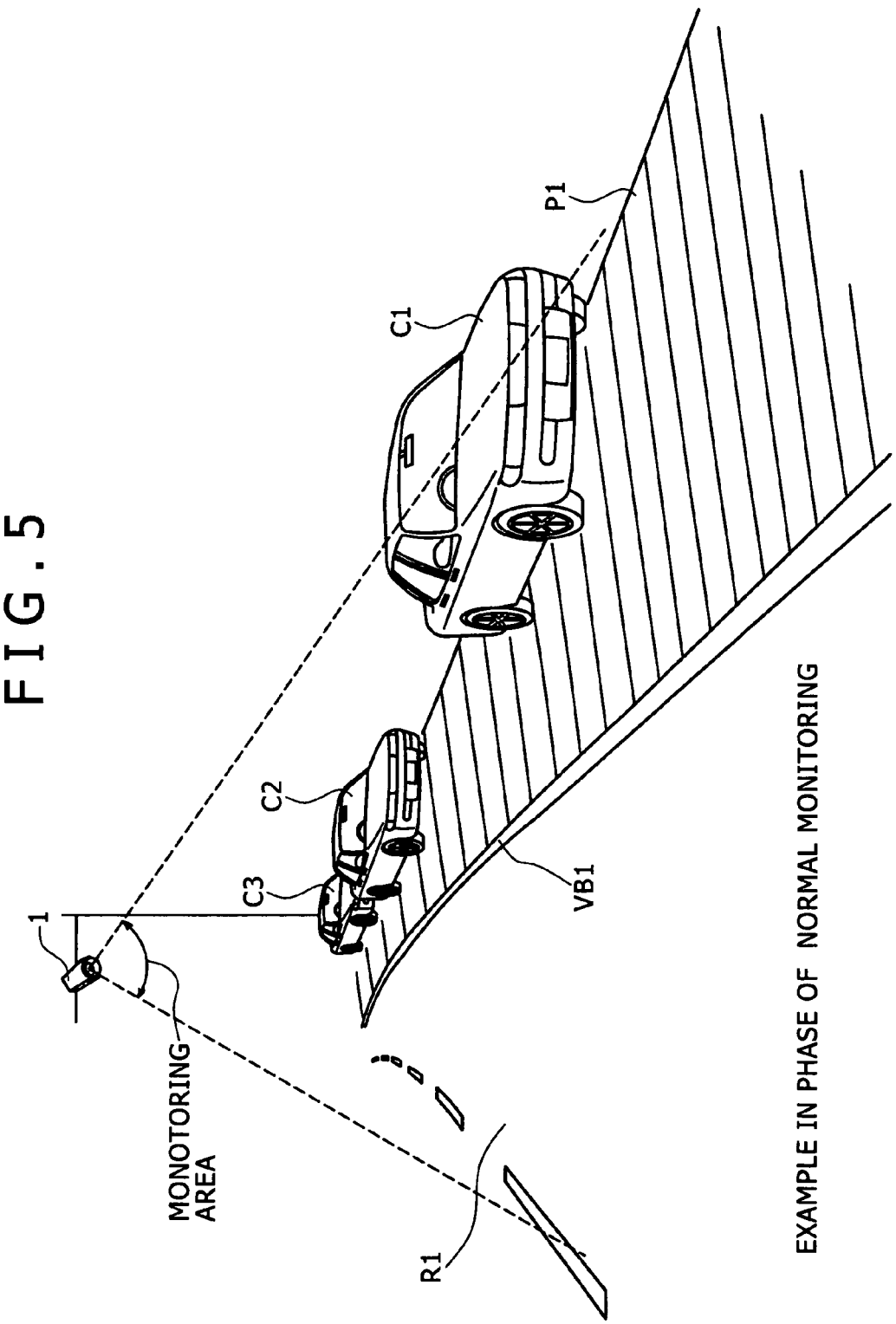
FIG. 5 is a view explaining an example in a phase of normal monitoring in the monitoring method according to the embodiment of the present invention.

FIG. 5 shows an example of the processing executed by the monitoring camera 1 at this time. Referring to FIG. 5, the monitoring camera 1 extensively photographs a no-parking area P1 and a peripheral area thereof. Thus, a situation is shown in which vehicles C1 to C3 are parked in the no-parking area P1. In addition, a virtual borderline VB1 is provided as a boundary line marking the boundary between the no-parking area P1 and other area in a road R1 shown in FIG. 5. The virtual borderline VB1 serves as the filter. It is noted that although in FIG. 5, the monitoring camera 1 is installed in a position where it can photograph the back side of each of the illegally-parked vehicles C1 to C3, it may also be installed in a position where it can carry out the photographing from the front side.

Referring back to the flow chart of FIG. 4, it is determined in Step S3 whether or not the vehicle enters the no-parking area. When it is determined that the vehicle enters the no-parking area, the vehicle which enters the no-parking area is photographed at the high resolution by the monitoring camera 1 (Step S4). Also, data on an image of the photographed vehicle, and information on the time at which the vehicle concerned enters the no-parking area are stored (Step S5). On the other hand, when it is determined that no vehicle enters the no-parking area, the operation returns back to the processing in Step S1.

Figure 6:
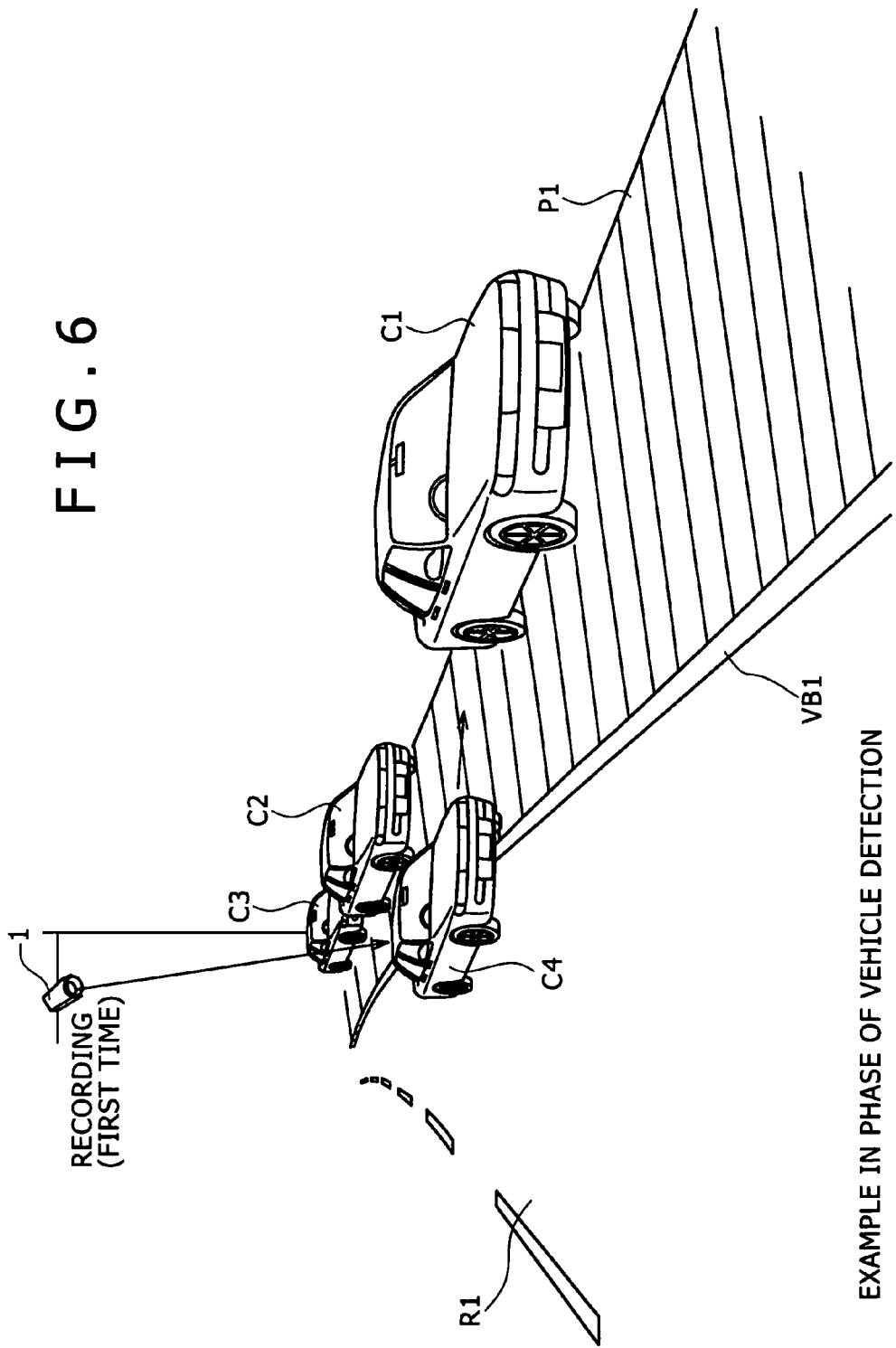
FIG. 6 is a view explaining an example in a phase of detection of a vehicle in the monitoring method according to the embodiment of the present invention.

FIG. 6 shows a state in which a vehicle C4 enters the no-parking area P1. That is to say, FIG. 6 shows a state in which the vehicle C4 reaches the virtual borderline VB1. When the video data obtained in the photographing of this state is transmitted from the monitoring camera 1 to the client terminal 3, the no-parking area enter/exit determining portion 106 (refer to FIG. 3) of the client terminal 3 executes the filter processing. Also, the no-parking area enter/exit determining portion 106 supplies the results of the filter processing to the rule changing portion 108. Then, the rule changing portion 108 supplies the changing instruction signal CA to the imaging setting changing portion 22 (refer to FIG. 2) of the monitoring camera 1.

The imaging setting changing portion 22 which receives the changing instruction signal CA transmits the change instruction to change the resolution together with the change instructions to change the photographing angle and the zoom ratio to the lens portion 211, the image pick-up portion 212, the image signal processing portion 213, and the data processing portion 214 (refer to FIG. 2) of the video data generating portion 21, respectively. The monitoring camera 1 including the image pick-up portion 212 which receives the change instruction transmitted thereto photographs the vehicle C4 crossing the virtual borderline VB1 at an angle of clearly photographing a number plate of the vehicle C4. Also, the image pick-up portion 212 transmits the data on the image of the photographed vehicle C4 and the number plate, and the photographing time information to the client terminal 3. Also, the data on the image of the photographed vehicle C4 and the number plate, and the photographing time information are stored in each of the metadata accumulating database 105 (refer to FIG. 3) and the video data accumulating database 104 (refer to FIG. 3) of the client terminal 3.

Referring back to the flow chart of FIG. 4 again, after the data on the vehicle image is recorded in Step S5, the monitoring camera 1 photographs the no-parking area and the peripheral area thereof at a wide angle similarly to the processing in Step S1 (Step S6). The image of the photographed vehicle is subjected to the image processing in the image signal processing portion 213 of the monitoring camera 1 whenever the photographing is carried out (Step S7).

Figure 7:
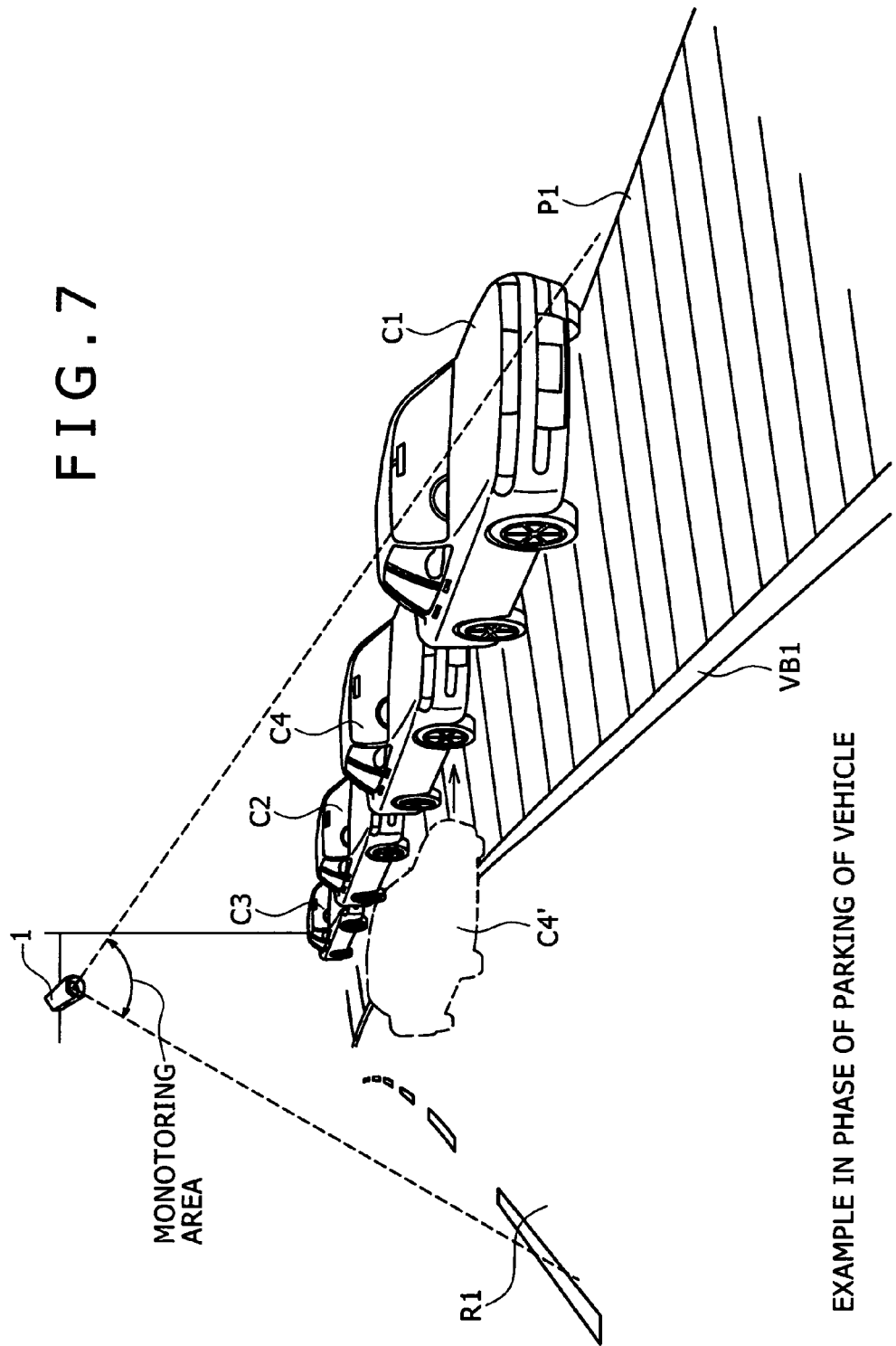
FIG. 7 is a view explaining an example in the course of parking of the vehicle in the monitoring method according to the embodiment of the present invention.

FIG. 7 shows an example in the case where the vehicle C4 is in the course of being parked in the no-parking area P1. As shown in the figure, in a state in which the vehicle C4 is parallel parked between the vehicle C1 on the front side and the vehicle C2 on the back side, a apace Al defined between the vehicle C4 and the vehicle C2 parked on the back side is very narrow. Therefore, it is difficult for the monitoring camera 1 to photograph the number plate of the vehicle C4. For this reason, in this embodiment of the present invention, a vehicle C4' which is crossing the virtual borderline VB1 is photographed by the monitoring camera 1.

Referring back to the flow chart of FIG. 4 again to continue the description, it is determined in Step S8 whether or not the vehicle gets across the virtual borderline VB1 to exit from the no-parking area to the outside. This determination is carried out in a state in which none of the vehicles being parked in the no-parking area P1 moves as shown in FIG. 7. That is to say, this determination is carried out in that state by the no-parking area enter/exit determining portion 106 of the client terminal 3 based on the video data and the metadata sent from the monitoring camera 1 which is in the course of photographing the monitoring area.

When it is determined that the vehicle crosses the virtual borderline VB1 based on the filter processing executed in Step S8 by the no-parking area enter/exit determining portion 106, the monitoring camera 1 photographs the vehicle C4 crossing the virtual borderline VB1 and the number plate thereof at the high resolution (Step S9). Also, the monitoring camera 1 transfers the data on the image of the photographed vehicle C4 and the number plate thereof, and the photographing time information to the client terminal 3. Then, the data on the image of the photographed vehicle C4 and the number plate thereof, and the photographing time information are stored in each of the metadata accumulating database 105 and the video data accumulating database 104 of the client terminal 3 (Step S10). On the other hand, when it is determined that no vehicle crosses the virtual borderline VB1, that is, none of the vehicles being parked moves, the operation returns back to the processing in Step S6.

Figure 8:
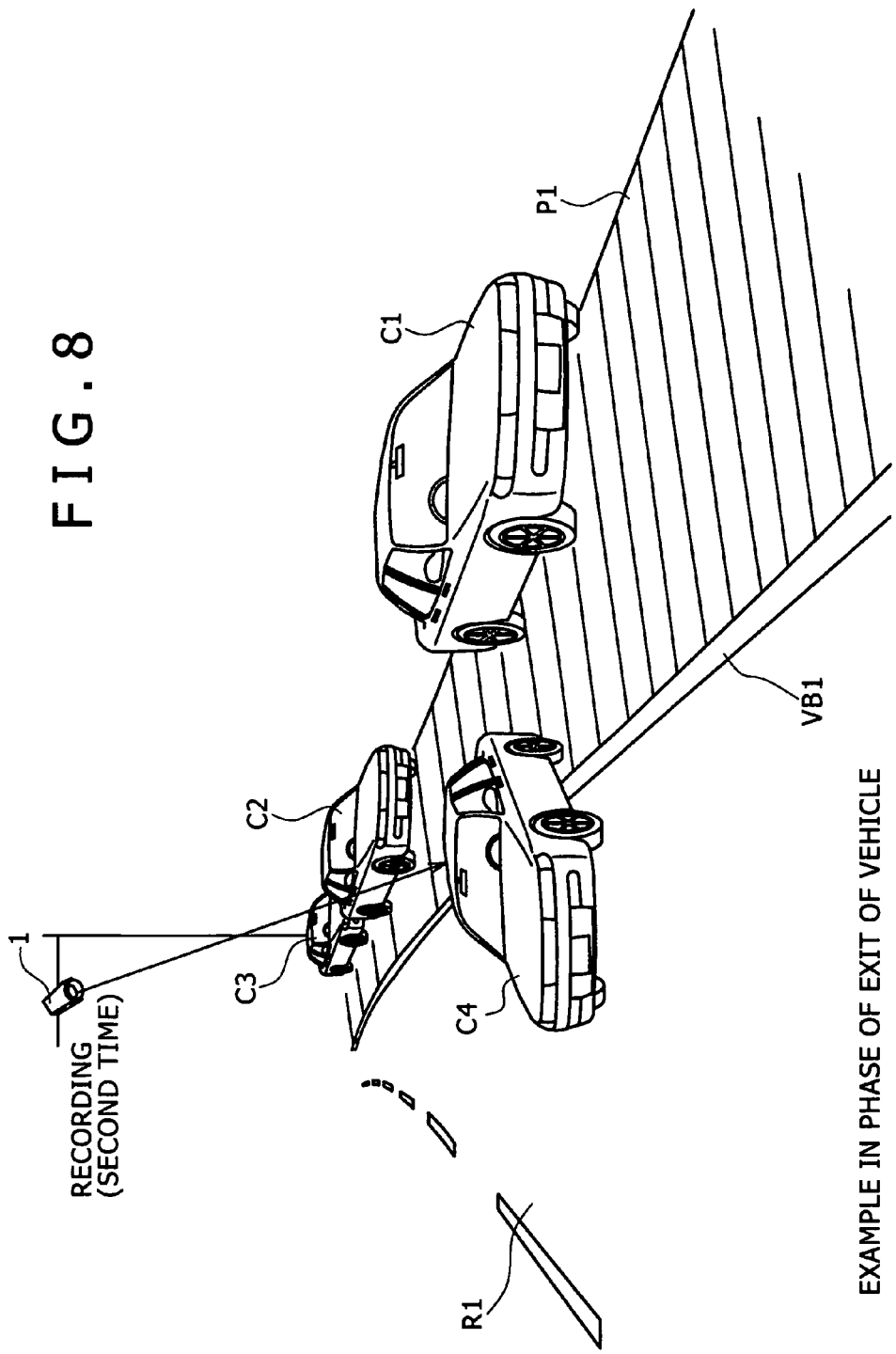
FIG. 8 is a view explaining an example in a phase of exit of the vehicle in the monitoring method according to the embodiment of the present invention.

FIG. 8 is a view showing a state in which the vehicle C4 moves from its parked position in order to exit from the no-parking area P1, and crosses the virtual borderline VB1. Thus, the movement of the vehicle C4 from its parked position results in that the monitoring camera 1 can photograph the number plate of the vehicle C4.

Also, a period of time for which the vehicle is parked in the no-parking area is calculated from the photographing time information stored together with the video data of the vehicle in Step S5 of the flow chart shown in FIG. 4, and the photographing time information stored together with the video data of the vehicle in Step S10. Thus, it is determined whether or not the parking period of time, for example, is 30 minutes or more (Step S11). The specification of the vehicle, and the processing for calculating the parking period of time are executed in the illegal parking determining portion 109 (refer to FIG. 3) of the client terminal 3. It is noted that whether or not the vehicle photographed in Step S4, and the vehicle photographed in Step S9 are identical to each other is determined based on the number of the number plate.

When it is determined in Step S11 that the parking period of time is 30 minutes or more, the vehicle concerned is regarded as the illegally-parked vehicle. Thus, the video data on the vehicle in the phase of enter into the no-parking area and in the phase of exit from the no-parking area which is stored in the video data accumulating database 104 of the client terminal 3, and the information on the enter time and the exit time about the vehicle which is stored in the metadata accumulating database 105 are transferred to the district police station under jurisdiction, or the like (Step S12). At this time, video data on a face of a driver may also be transmitted together therewith. On the other hand, when it is determined that the parking period of time is shorter than 30 minutes, the operation returns back to the processing in Step S1 again. It is noted that the parking period of time as the threshold value for the illegal parking crackdown is not limited to 30 minutes, and thus any other suitable time unit may also be freely set.

The vehicle in the phase of enter into the no-parking area, and the vehicle in the phase of exit from the no-parking area are photographed, and the vehicle is specified from the number plate information on the number plate contained in the image in the manner as described above. As a result, it is unnecessary to perform the photographing in the situation in which the number plates of the vehicles in the phase of the parallel parking or the like are hardly viewed. In a word, since there is less limit to the angle at which the number plate is photographed, a plurality of vehicles can be photographed by one monitoring camera. For this reason, the cost for the construction of the monitoring system can be greatly reduced as compared with the case where a plurality of monitoring cameras are installed.

The period of time for which the vehicle is parked in the no-parking area is calculated from the information on the time at which the vehicle enters the no-parking area, and the information on the time at which the vehicle exits from the no-parking area. As a result, the illegal parking crackdown can be carried out depending on the parking period of time.

It is noted that although the description has been given so far with respect to the embodiment in which the present invention is applied to the construction using the monitoring camera and the client terminal, the present invention is not limited to that construction, and thus can be applied to the various constructions. For example, an apparatus dedicated to the video recording which has a dynamic body detecting function and the metadata analyzing function, or the like may also be used instead of using the client terminal.

In addition, the system for monitoring the illegal parking of the vehicle in the no-parking area has been described in the above embodiments. However, the present invention can also be applied to any other suitable monitoring processing for monitoring and recording that the vehicle is parked in the parking area provided in a side strip on a road, and performing the accounting corresponding to the parking period of time for the parked vehicle thus monitored and recorded.

In addition, although a series of processing in the embodiment described above can be executed by the hardware, it can also be executed by the software. When the series of processing is executed by the software, it is executed by installing a program constituting the software in a computer incorporated in the dedicated hardware. Or, it is executed by installing a program constituting desired software in a personal computer or the like which can carry out the various functions by installing therein the various programs.

It should be understood by those skilled in the art that various modifications, combinations, sub-combinations and alterations may occur depending on design requirements and other factors insofar as they are within the scope of the appended claims or the equivalents thereof.

What is claimed is:

1. A monitoring system for monitoring parking of a vehicle in a specific area comprising:
   a monitoring image pick-up device; and
   a monitoring apparatus configured to perform the monitoring based on video data obtained by capturing an image of the vehicle by said monitoring image pick-up device;
   said monitoring image pick-up device including
   an image pick-up portion for capturing an image of said specific area and a peripheral area thereof to generate the video data,
   said monitoring apparatus including
   a parking area enter/exit determining portion determining whether or not a vehicle detected based on the video data generated by said image pick-up portion of said monitoring image pick-up apparatus enters or exits from said specific area,
   an imaging setting change instructing portion instructing said image pick-up portion of said monitoring image pick-up device to perform changing of an image setting to another one suitable for imaging of a vehicle image containing therein specific information on said vehicle when said parking area enter/exit determining portion determines that said vehicle detected based on the video data enters or exits from said specific area, and
   a parking determining portion calculating a period of time for which said vehicle is parked in said specific area based on imaging time of an image when said vehicle enters said specific area, and imaging time of an image when said vehicle exits from said specific area, both the images being captured by said image pick-up portion of said monitoring image pick-up device in accordance with the instruction issued from said imaging setting changing instructing portion,
   wherein said specific area is an area set as a no-parking area even though the no-parking area could accommodate a plurality of parked vehicles arranged in a line such that a second vehicle is parked between a first vehicle and a third vehicle such that a front of the second vehicle is behind a back of the first vehicle and a back of the second vehicle is in front of a front of the third vehicle,
   wherein when the period of time calculated by the parking determining portion for which said vehicle is parked in the no-parking area is greater than a predetermined amount of time, illegal information pertaining to (i) said vehicle and (ii) the time when said vehicle enters the no-parking area and the time when said vehicle exits from the no-parking area or the calculated period of time corresponding thereto is transferred to a respective police station having jurisdiction,
   wherein a virtual borderline is provided in a boundary between said specific area and the peripheral area thereof, and
   wherein said specific area enter/exit determining portion determines whether or not said vehicle enters or exits from said specific area depending on whether or not said vehicle crosses said virtual borderline by utilizing the image or images of said vehicle captured by said image pick-up portion which are obtained upon said vehicle crossing the virtual borderline such that the image or images are not obtained while said vehicle is parked in said specific area.

2. The monitoring system according to claim 1, wherein the specific information on said vehicle is information on a number plate of said vehicle.

3. The monitoring system according to claim 2, wherein said parking determining portion executes processing for comparing the vehicle which enters said specific area and the vehicle which exits from said specific area with each other based on the information on the number plate of said vehicle contained in an image captured by said image pick-up portion of said monitoring image pick-up device.

4. The monitoring system according to claim 1, wherein the imaging setting suitable for the imaging of the vehicle image containing therein the specific information on said vehicle is a setting for performing the imaging at a high resolution.

5. The monitoring system according to claim 1, wherein said monitoring image pick-up device includes an attribute information generating portion for generating attribute information containing therein photographing time information of the video data generated by said image pick-up portion; and
   time at which the image of the vehicle is captured in a phase of enter into said specific area, and time at which the image of the vehicle is captured in a phase of exit from said specific area constitute photographing time information generated by said attribute information generating portion.

6. The monitoring system according to claim 1, wherein when the period of time calculated by the parking determining portion for which said vehicle is parked in the no-parking area is greater than the predetermined amount of time, in addition to the information pertaining to (i) said vehicle and (ii) the time when said vehicle enters the no-parking area and the time when said vehicle exits from the no-parking area or the calculated period of time corresponding thereto, video data on a face of a driver of the vehicle is transferred to the respective police station having jurisdiction.

7. A monitoring apparatus for monitoring parking of a vehicle in a specific area, comprising:
   an image pick-up portion configured to capture an image of said specific area and a peripheral area thereof to generate video data;
   a parking area enter/exit determining portion configured to determine whether or not a vehicle detected based on the video data enters or exits from said specific area;
   an imaging setting change instructing portion configured to instruct said image pick-up portion to perform changing of an imaging setting to another one suitable for imaging of a vehicle image containing therein specific information on said vehicle when said parking area enter/exit determining portion determines that said vehicle detected based on the video data enters or exits from said specific area; and
   a parking determining portion configured to calculate a period of time for which said vehicle is parked in said specific area based on imaging time of an image when said vehicle enters said specific area, and imaging time of an image when said vehicle exits from said specific area, both the images being captured by said image pick-up portion in accordance with the instruction issued from said imaging setting change instructing portion, wherein said specific area is an area set as a no-parking area even though the no-parking area could accommodate a plurality of parked vehicles arranged in a line such that a second vehicle is parked between a first vehicle and a third vehicle such that a front of the second vehicle is behind a back of the first vehicle and a back of the second vehicle is in front of a front of the third vehicle, wherein when the period of time calculated by the parking determining portion for which said vehicle is parked in the no-parking area is greater than a predetermined amount of time, illegal information pertaining to (i) said vehicle and (ii) the time when said vehicle enters the no-parking area and the time when said vehicle exits from the no-parking area or the calculated period of time corresponding thereto is transferred to a respective police station having jurisdiction, wherein a virtual borderline is provided in a boundary between said specific area and the peripheral area thereof, and wherein said specific area enter/exit determining portion determines whether or not said vehicle enters or exits from said specific area depending on whether or not said vehicle crosses said virtual borderline by utilizing the image or images of said vehicle captured by said image pick-up portion which are obtained upon said vehicle crossing the virtual borderline such that the image or images are not obtained while said vehicle is parked in said specific area.

8. A monitoring method of monitoring parking of a vehicle in a specific area, comprising the steps of:

capturing an image of said specific area and a peripheral area thereof to generate video data;

determining whether or not a vehicle detected based on the video data enters or exits from said specific area;

performing changing of an imaging setting to another one suitable for imaging of a vehicle image containing therein specific information on said vehicle when it is determined that said vehicle detected based on the video data enters or exits from said specific area, thereby capturing an image of said vehicle containing therein the specific information on said vehicle; and calculating a period of time for which said vehicle is parked in said specific area based on time at which an image of said vehicle in a phase of entering said specific area is captured, and time at which an image of said vehicle in a phase of exiting from said specific area is captured, wherein said specific area is an area set as a no-parking area even though the no-parking area could accommodate a plurality of parked vehicles arranged in a line such that a second vehicle is parked between a first vehicle and a third vehicle such that a front of the second vehicle is behind a back of the first vehicle and a back of the second vehicle is in front of a front of the third vehicle, wherein when the period of time calculated by the calculating step for which said vehicle is parked in the no-parking area is greater than a predetermined amount of time, illegal information pertaining to (i) said vehicle and (ii) the time when said vehicle enters the no-parking area and the time when said vehicle exits from the no-parking area or the calculated period of time corresponding thereto is transferred to a respective police station having jurisdiction, wherein a virtual borderline is provided in a boundary between said specific area and the peripheral area thereof, and wherein said specific area enter/exit determining portion determines whether or not said vehicle enters or exits from said specific area depending on whether or not said vehicle crosses said virtual borderline by utilizing the image or images of said vehicle captured by said image pick-up portion which are obtained upon said vehicle crossing the virtual borderline such that the image or images are not obtained while said vehicle is parked in said specific area.

* * * * *